United States Patent
Todoroki

[19]
[11] Patent Number: 5,850,419
[45] Date of Patent: Dec. 15, 1998

[54] TIME DIVERSITY COMMUNICATION METHOD AND COMMUNICATION DEVICE

[75] Inventor: Toshiya Todoroki, Tokyo, Japan

[73] Assignee: NEC Corporation, Tokyo, Japan

[21] Appl. No.: 827,375

[22] Filed: Mar. 27, 1997

[30] Foreign Application Priority Data

Mar. 27, 1996 [JP] Japan ................................. 8-071906

[51] Int. Cl.[6] .................................. H04B 7/02; H04L 1/02
[52] U.S. Cl. .......................... 375/267; 375/299; 375/347
[58] Field of Search .................................. 375/267, 299, 375/347

[56] References Cited

U.S. PATENT DOCUMENTS

| | | | |
|---|---|---|---|
| 5,446,759 | 8/1995 | Campana, Jr. | 375/267 |
| 5,446,959 | 9/1995 | Saleh et al. | 375/40 |

FOREIGN PATENT DOCUMENTS

| | | |
|---|---|---|
| 58-95446 | 6/1983 | Japan . |
| 63-37540 | 7/1988 | Japan . |

*Primary Examiner*—Stephen Chin
*Assistant Examiner*—Frederick Yu
*Attorney, Agent, or Firm*—Young & Thompson

[57] ABSTRACT

In time diversity communication system, loss of data or generation of incorrect data may occur due to, for example, the shadow effect. In the present invention, on the transmission side, an interlaced signal is generated in which the input digital signal string is combined with the same signal string delayed by n bits, k redundancy bits are added to every m bits of this signal, the signal is divided into blocks of (m+k) bits, an interleaving process is executed for every j blocks in which unique words are added, following which the signal is transmitted. On the receiving side, unique words are detected, a de-interleaving process is performed, and a check is made for the presence of error signals. The delayed and non-delayed signals are next separated from the decoded data, and depending on the state of the signals, the desired signal is selected at selector 33 and outputted. A conformity judgment circuit judges conformity with the separated signal determined to be effective using effective gate signals indicating the effectiveness or ineffectiveness of decoded data, performs switching control of the separated signals, and monitors synchronization.

9 Claims, 9 Drawing Sheets

FIG. 6A
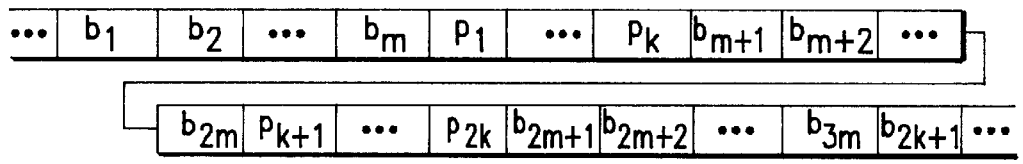
FIG. 6B
| $b_1$ | $b_2$ | ... | $b_m$ | $p_1$ | ... | $p_k$ |
|---|---|---|---|---|---|---|
| $b_{m+1}$ | $b_{m+2}$ | ... | $b_{2m}$ | $p_{k+1}$ | ... | $p_{2k}$ |
| ⋮ | ⋮ | ⋮ | ⋮ | ⋮ | ⋮ | ⋮ |
| $b_{(j-1)m+1}$ | $b_{(j-1)m+2}$ | ... | $b_{jm}$ | $b_{(j-1)k+1}$ | ... | $p_{jk}$ |
FIG. 6C
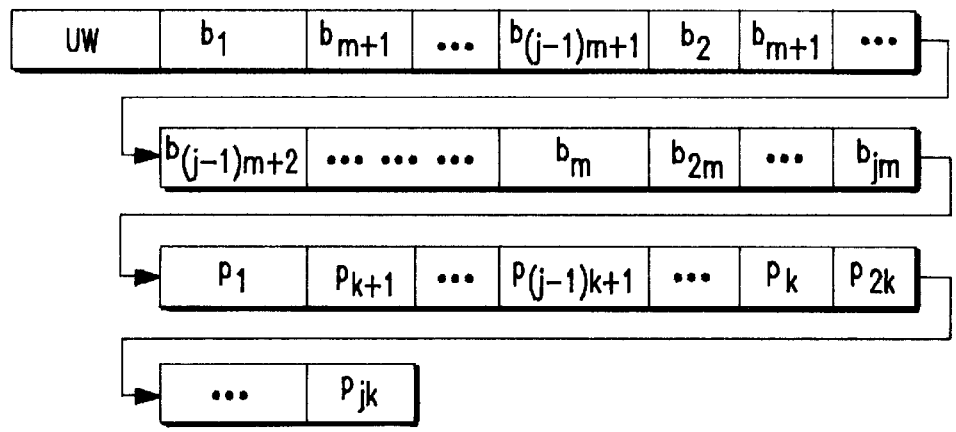
FIG. 6D
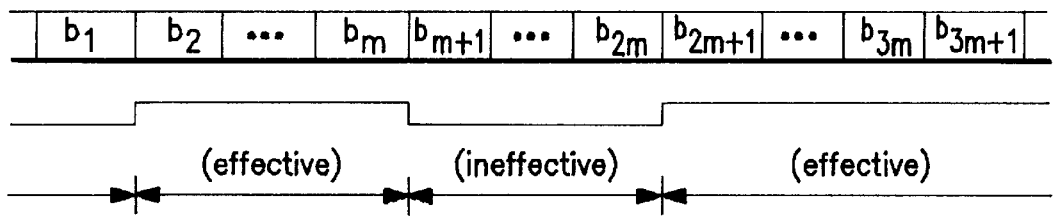

TIME DIVERSITY COMMUNICATION METHOD AND COMMUNICATION DEVICE

BACKGROUND OF THE INVENTION

1. Field of the Invention

The present invention relates to a time diversity communication method and device, and particularly to a diversity communication method and device for improving transmission characteristics in digital mobile communications in which losses and errors are generated in data strings by the shadow effect and other causes.

2. Description of the Related Art

Diversity communication methods are directed toward improving transmission characteristics by establishing a plurality of transmission channels between which the correlation in fluctuation of received signal level is low, and selecting or synthesizing the output of these channels. One example of a time diversity communication system of the prior art is described in Japanese Patent Laid-open No. 37540/88. FIG. 1 is a block diagram showing a schematic view of the time diversity communication system described in this official gazette, and FIG. 2 shows the time assignment of transmitted and received signals. A data string 90 inputted to terminal 40 is represented by $\{a_i\}$ (i being an integer), a data string 91 outputted by coder 41 is represented by $\{b_i\}$, and received data string 92 outputted from terminal 52 of the receiving device is represented by $\{c_i\}$. $\{a_i\}$ is a data string that obeys a clock frequency $f_0$, while the clock frequency of $\{b_i\}$ is 2 $f_0$. $\{a_i\}$ is encoded to $\{b_i\}$ as follows: To even-numbered time slots $\{b_{2i}\}$, data $\{a_i\}$ inputted at that time are assigned without change, i.e., $b_{2i}=a_i$. In contrast, to odd-numbered time slots $\{b_{2i-1}\}$, data $\{a_{i-n}\}$ are assigned that have been delayed n-bits, i.e., $b_{2i-1}=a_{i-n}$. Thus, delayed and non-delayed data are transmitted alternately (hereinbelow referred to as "interlaced signals"), with $a_1$ being assigned and inserted into two time slots $b_2$ and $b_{2n+1}$ separated by n-bit intervals, and $a_n$ and $a_{n+1}$ being respectively assigned to $b_{2n}$ and $b_{2n+2}$ on either side of $b_{2n+1}$.

Here, an outline of the prior art shown in FIG. 1 will be explained. Transmission signal 90 ($a_i$) inputted from input terminal 40 is first encoded to interlaced signal 91 $\{b_i\}$ at encoder 41, then undergoes modulation such as phase-shift keying (PSK) at modulator 42, is amplified to the required transmission power at power amplifier 43, and finally, is outputted from transmission antenna 44. Radiowaves received at receiver antenna 45 are detected at receiver 46 and then inputted to expansion circuit 48 and clock regeneration circuit 47. Expansion circuit 48 extracts both the delayed and non-delayed data assigned to each time slot from the interlaced signal and outputs to synthesizing circuit 49. Synthesizing circuit 49 receives from synthesis control circuit 50 a synthesis coefficient that accords with the reception level in each time slot and outputs synthesized signals in which the two types of data are synthesized. The synthesized signal is discriminated and judged at discrimination/judging circuit 51, and a demodulated signal 92 ($c_i$) is outputted to output terminal 52.

FIG. 3 shows one example of the construction of encoder 41. Transmission data $\{a_i\}$ inputted from input terminal 60 are inputted to selector 62 both as unaltered data and as data that have passed through n-bit shift register 61. Shift register 61 shifts the transmission data at clock frequency $f_0$, and selector 62 sequentially switches between inputted signals at clock frequency 2 $f_0$ and outputs the data as interlaced signal $\{b_i\}$ from output terminal 64. Finally, in order to synchronize input data with a transmission clock, clock frequency 2 $f_0$ inputted from input terminal 65 is divided into halves at frequency divider circuit 63 and input clock $f_0$ is outputted to output terminal 66.

FIG. 4 shows an example of the construction of expansion circuit 48, synthesizing circuit 49, and synthesis control circuit 50 of FIG. 1. A reception level signal that indicates the reception level inputted from receiver 46 to input terminal 79 of synthesis control circuit 50 is inputted to synthesis control signal generation circuit 75 as two reception level signals corresponding to the interlaced signal, one signal being the unaltered reception level signal and the other being delayed by delay circuit 76 having a delay interval appropriate to the n-bit portion of the data. In accordance with a preset algorithm, synthesis control signal generation circuit 75 finds a synthesis coefficient according to the reception level and outputs the result as synthesis control signal 81 to synthesizing circuit 49. Meanwhile, receiver detection output is inputted from received signal input terminal 78 of expansion circuit 48, and this signal is respectively inputted as is and as a signal delayed by the time of the n-bit interval by passage through n-bit shift register 71 to the two input terminals of each of combination detection circuit 72 and synthesizing circuit 49.

At combination detection circuit 72, the correct combination of the combination of even-numbered and odd-numbered time slots is detected and a reset signal indicating this timing is generated and outputted to frequency divider circuit 74. Using this reset timing, frequency divider circuit 74 divides into halves the regeneration clock 2 $f_0$ inputted from clock regeneration circuit 47 by way of input terminal 70, and outputs received clock 82 synchronized with the synthesizing circuit output signal to synthesizing circuit 49 and output terminal 77. Synthesizing circuit 49 synthesizes the two received signals at the received clock timing based on synthesis control signal 81, and outputs synthesizing circuit output signal 83 to output terminal 80. As can be understood from the foregoing explanation, the circuits shown in this figure synthesize a single signal that has been interlaced and transmitted in two time slots according to the reception level of each, and the synthesized output signal therefore can be expected to have a lower coding error rate than either signal preceding synthesis.

The above-described time diversity communication system of the prior art distinguishes the reception state from a receiver based on the reception level, and as a result, executes synthesis of received data by applying the demodulated data of signals having a higher reception level. However, the correctness of received data is not necessarily determined only by the reception level, and satisfactory communication cannot be assured even by selecting data of maximum reception level. In addition, in the event of a disruption to clock synchronization of the clock regeneration circuit due to, for example, blockage of radio waves by an obstruction and the consequent occurrence of bit divergence, problems have been encountered regarding the stability of subsequent processing of decoded data up to re-establishment of synchronization. Moreover, there is also the problem of loss of decoded data during the interval up to recovery from a non-synchronized state to a synchronized state in the receiving device.

SUMMARY OF THE INVENTION

The present invention has the object of providing a time diversity communication method and device that allow selection of correct data from delayed and non-delayed data separated from an interlaced signal by constantly monitoring and judging the effectiveness of received decoded data, and that enable highly reliable diversity communication.

Another object of the present invention is to provide a time diversity communication method and device that monitor the synchronized state of transmitted and received signals by means of the rate of conformity of the above-described data that are separated from an interlaced signal, that quickly execute a return to a synchronized state at times of non-synchronization, and that constantly monitor divergence from synchronization even when in a synchronized state.

Yet another object of the present invention is to provide a time diversity communication method and device that can absorb disruptions to clock synchronization and bit divergence caused by, for example, blockage of radio waves due to the shadow effect, and that, in the event of short breaks (hits) in data or distortion of data, can prevent the generation of incorrect data before switching to correct data while still keeping losses in decoded data to a low level.

In the time diversity communication method and device of the present invention, first on the sending side:

an encoder produces an interlaced signal from the input signal by interlacing a non-delayed signal, which is a signal inputted at a current time, with a delayed signal that is the signal inputted n bits before the non-delayed signal that is delayed n bits, and an transmission channel encoder encodes by dividing the interlaced signal every m bits (where m<n), and adds k redundancy bits to each block of m bits. Then an interleaver executes an interleaving process for each block of (m+k)×j bits of an encoded signal string and adds a unique word to each block of (m+k)×j bits.

This interleaved signal string is modulated, amplified and then sent as a transmission signal at a higher bit rate than that of the input signal.

Next on the receiving side:

after demodulated, the demodulated received signal is stored within a buffer at a regeneration clock, and a de-interleaver reads out data stored in the buffer at a prescribed clock, performs de-interleaving, and produces a signal string of continuous (m+k)×j bit blocks with the unique words. Parallel to the above de-interleaving, phase control means detects the unique words within a data string read out from the buffer, and corrects the read-out address from the buffer upon detection of disparity in the phase of unique words. Then a transmission channel decoder uses redundancy bits to judge effectiveness of a de-interleaved signal string at every m bits of an interlaced signal to which the redundancy bits are added, and outputs effective gate signals that indicate either effectiveness or ineffectiveness in accordance with this judgment together with a decoded interlaced signal from which the redundancy bits have been eliminated.

For the decoded interlaced signal from the transmission channel decoder, a first serial-parallel converter separates the non-delayed signal and the delayed signal, and simultaneously a second serial-parallel converter separates the effective gate signal corresponding to each of the non-delayed signal and delayed signal. Then a first delay means and a second delay means delay by n bits each of the separated non-delayed signal and the effective gate signal corresponding to the non-delayed signal, respectively.

In this case, a definition is given that the non-delayed signal that has been delayed n bits is signal (a) and the separated delayed signal is signal (b), the effective gate signal that has been delayed n bits is signal (c) and the effective gate signal corresponding to this signal (b) is signal (d), and moreover, a state in which signal (a) and signal (b) continuously match is considered to be a synchronized state.

Then third delay means confers a delay of a prescribed number of bits to signal (a) outputted by the first delay means, and fourth delay means confers a delay of a prescribed number of bits to signal (b) separated by the first serial-parallel converter, thereafter a selector selects one of output signals (a) and (b) outputted from the third and fourth delay means, respectively, and outputs the selected signal to the outside as a demodulated signal.

For the above selection of the demodulated signal by the selector, a conformity judgment circuit inputs non-delayed signal (a), delayed signal (b), effective gate signal (c) and effective gate signal (d); monitors whether signals (a, b) are effective or ineffective based on the states of signals (c, d); detects whether signal (b) matches signal (a), both signals being determined as effective; judges the synchronized state or non-synchronized state of the two signals (a, b) based on the number of continuous matches exceeds or falls short of a prescribed number; and gives selection commands to the selector based on the judgment results.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 6(a) shows a transmission channel encoded data string, FIG. 6(b) shows the method of interleaving, FIG. 6(c) shows an interleaved output data string, and FIG. 6(d) shows a decoded data string and a corresponding effective gate signal.

DETAILED DESCRIPTION OF THE PREFERRED EMBODIMENT

An embodiment of the present invention will next be described with reference to the accompanying figures. FIG.

5 is a block diagram showing the construction of one embodiment of a communication device according to the time diversity communication method of the present invention. Explanation of the time assignment of transmitted and received signals in the present embodiment will be presented with respect to an example similar to that of the above-described prior-art example.

Figure 1:
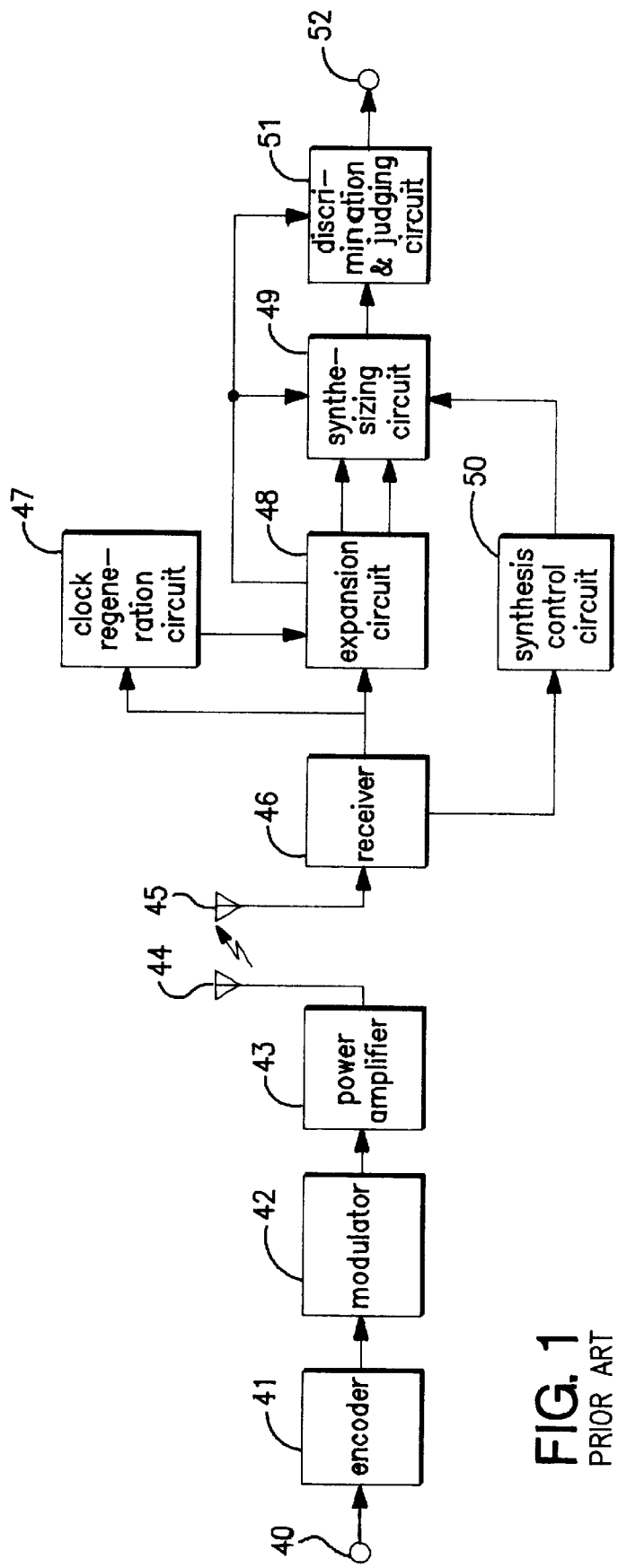
FIG. 1 is a block diagram showing the construction of a time diversity communication device of the prior art.
Figure 2:
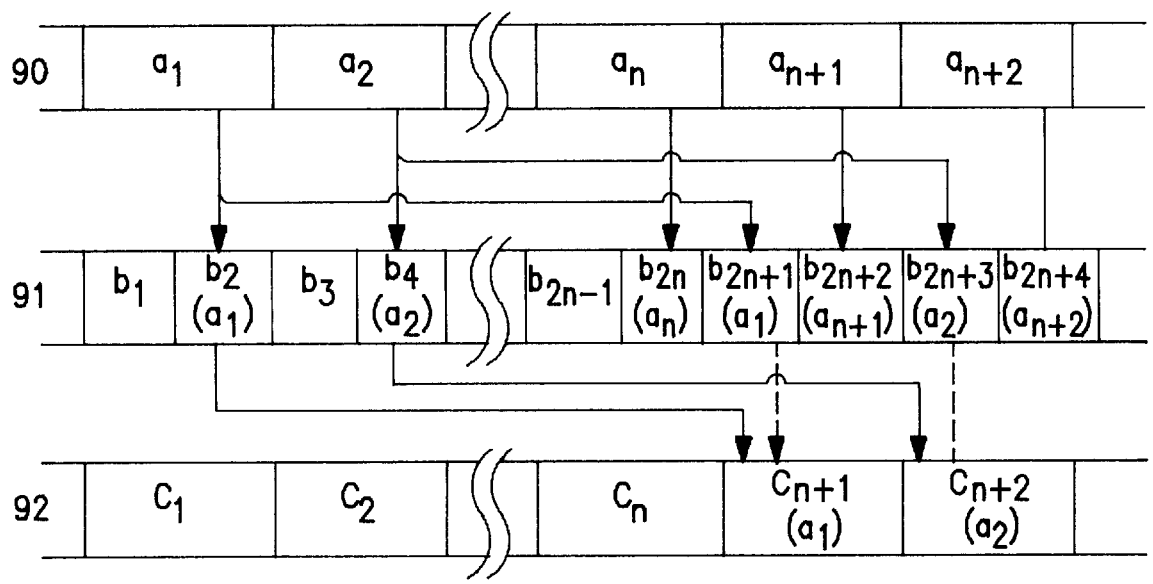
FIG. 2 shows the composition of time slot assignment of transmitted and received signals in the prior art example shown in FIG. 1.
Figure 3:
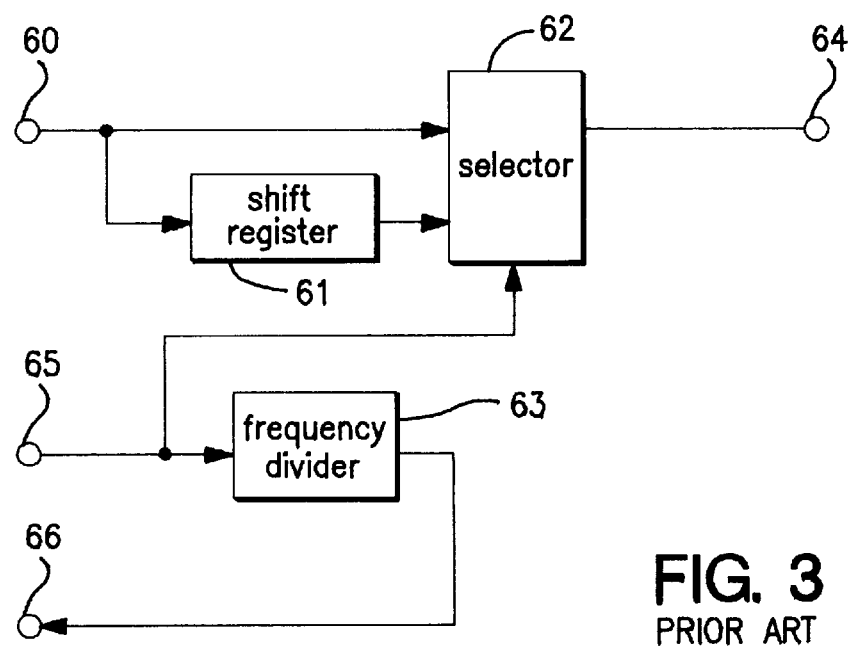
FIG. 3 is a block diagram showing the construction of the encoder of FIG. 1.
Figure 4:
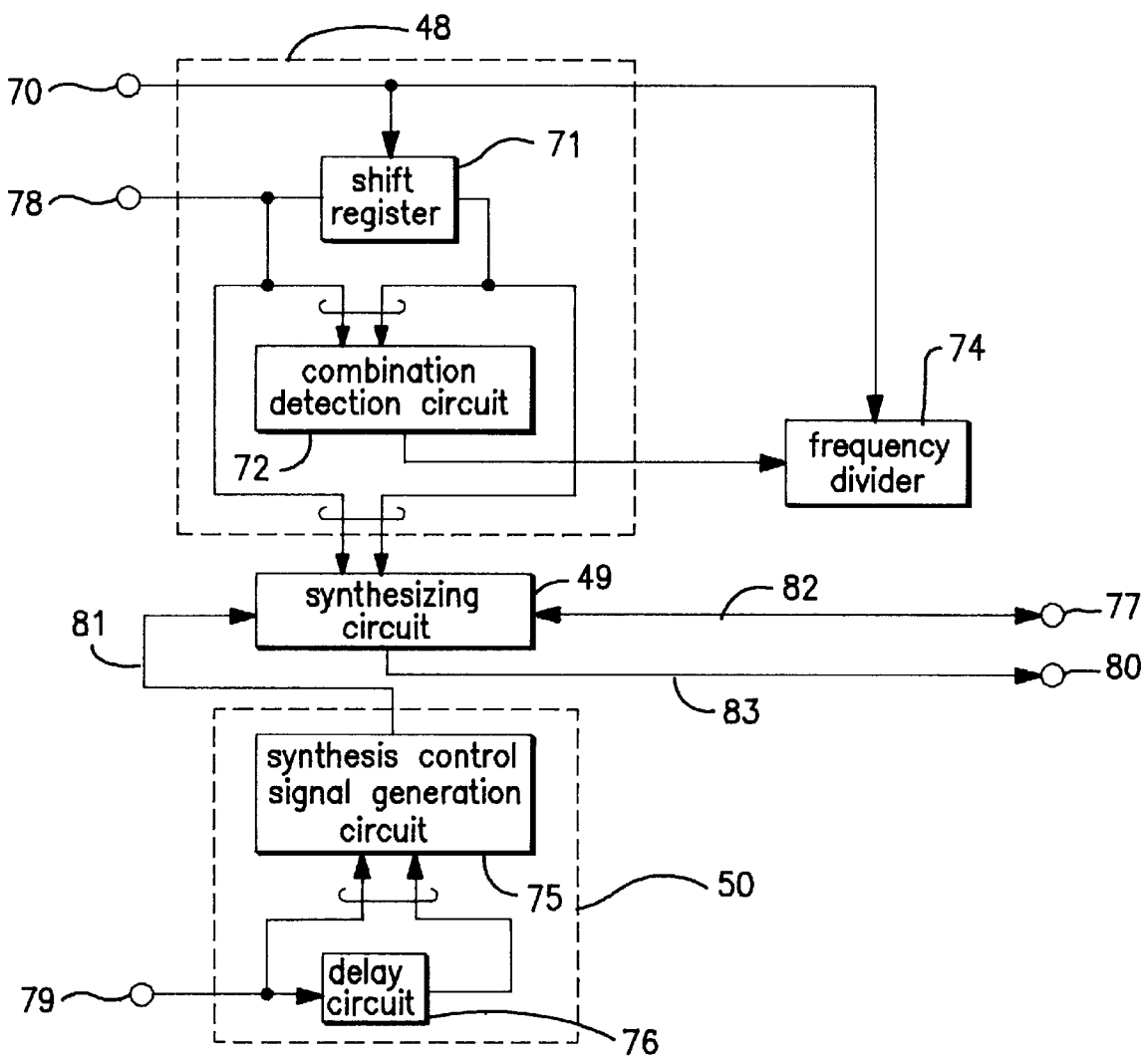
FIG. 4 is a block diagram showing the construction of the expansion circuit, synthesis control circuit, and synthesizing circuit shown in FIG. 1.

The encoding of a transmission signal is identical to the example described in FIG. 2, and the construction of the encoder 41 used to effect this type of encoding may be equivalent to that of encoder 41 shown in FIG. 3.

Figure 5:
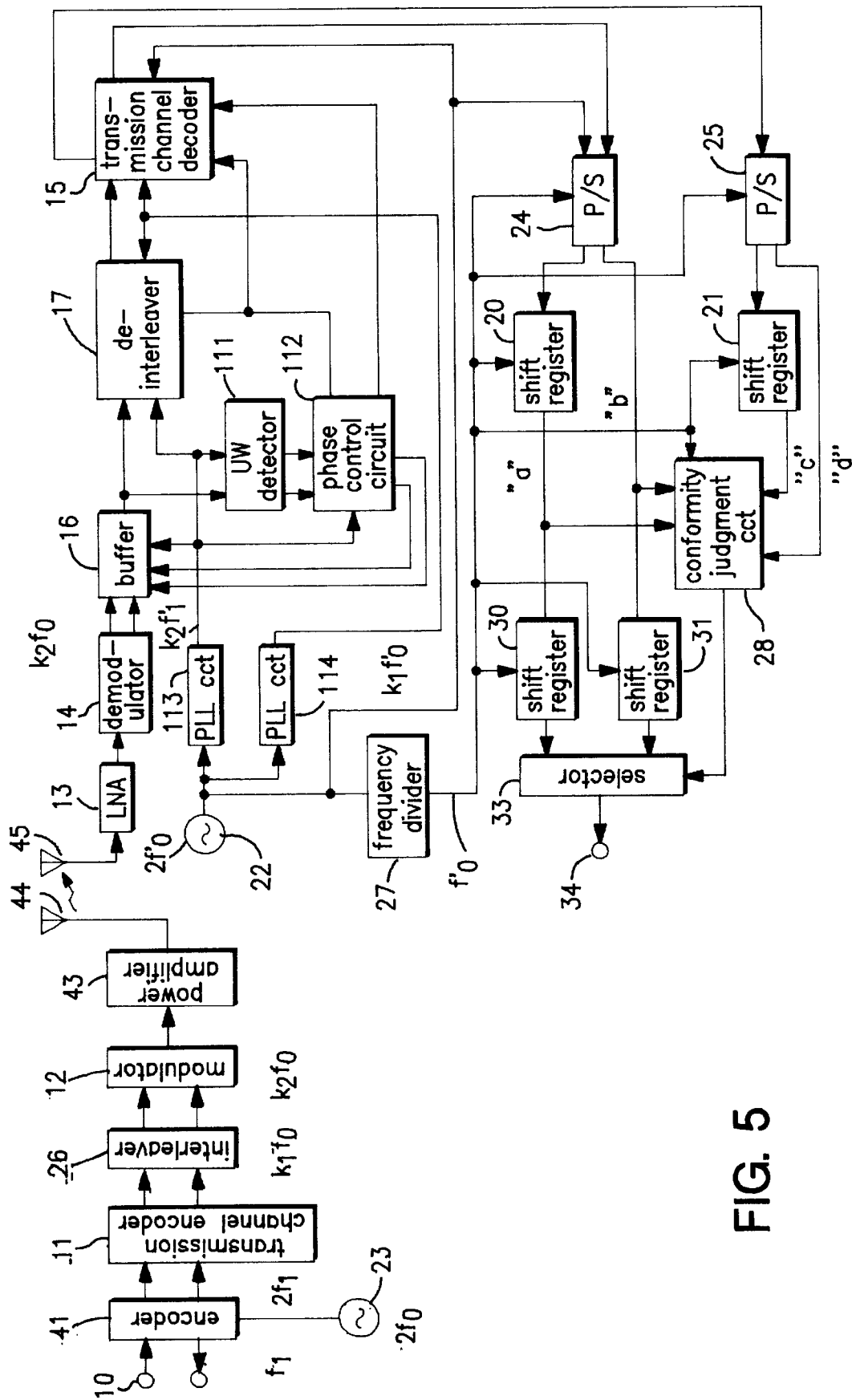
FIG. 5 is a block diagram showing the construction of one embodiment of the time diversity communication device of the present invention.

Explanation will first be given regarding the construction and operation of the transmission-side device shown in FIG. 5. A transmission signal inputted from input terminal 10 is first encoded at encoder 41 based on an oscillation signal from oscillator 23 and then inputted to transmission channel encoder 11. The above-described interlaced signal $\{b_i\}$ is encoded at transmission channel encoder 11 by dividing at each m bits (where m<n), adding k redundancy bits $\{p_i\}$ at every m bits, as shown in FIG. 6(a), and inputting to interleaver 26. In each of these blocks of (m+k) bits, the leading bit is a non-delayed bit, and encoding proceeds such that an integral number of sets of a non-delayed bit and a delayed bit are included within (m+k) bits. As shown in FIG. 6(b), the blocks of (m+k) bits encoded at transmission channel encoder 11 are aligned in sets of j blocks at interleaver 26, the bit strings are interleaved as shown in FIG. 6(c), and strings are outputted with a unique word (UW) added for each interleaved block. The output of interleaver 26 undergoes, for example, PSK modulation at modulator 12, is amplified to the required transmission power at power amplifier 43, and is finally sent out from transmission antenna 44.

Construction and operation of the device on the receiving side will next be described. The modulated waves received at reception antenna 45 are amplified at low-noise amplifier 13 and demodulated at demodulator 14. The clock $k_2 f_0$ regenerated at demodulator 14 is used to store the demodulated data string in buffer 16. De-interleaver 17 reads out data stored in buffer 16 at clock $k_2 f_0'$ ($f_0'$ is nearly equal to $f_0$) generated by PLL circuit 113 from the oscillation frequency 2 $f_0'$ of oscillator 22. In order to carry out de-interleaving correctly, UW-detector 111 detects the unique words UW added at every (m+k)×j bits of the data string read out from buffer 16. UW-detector 111 further has the function of recognizing establishment of unique-word synchronization by detecting r-times (r≧2) the successive unique word patterns appearing at every unique-word cycle, and after establishing synchronization, recognizing loss of unique-word synchronization when unique word patterns cannot be successively detected s- times (s≧2). When UW-detector 111 judges unique-word synchronization, it outputs a UW-position pulse signal 1 at every unique-word cycle and a UW synchronizing signal to phase control circuit 112.

Figure 7:
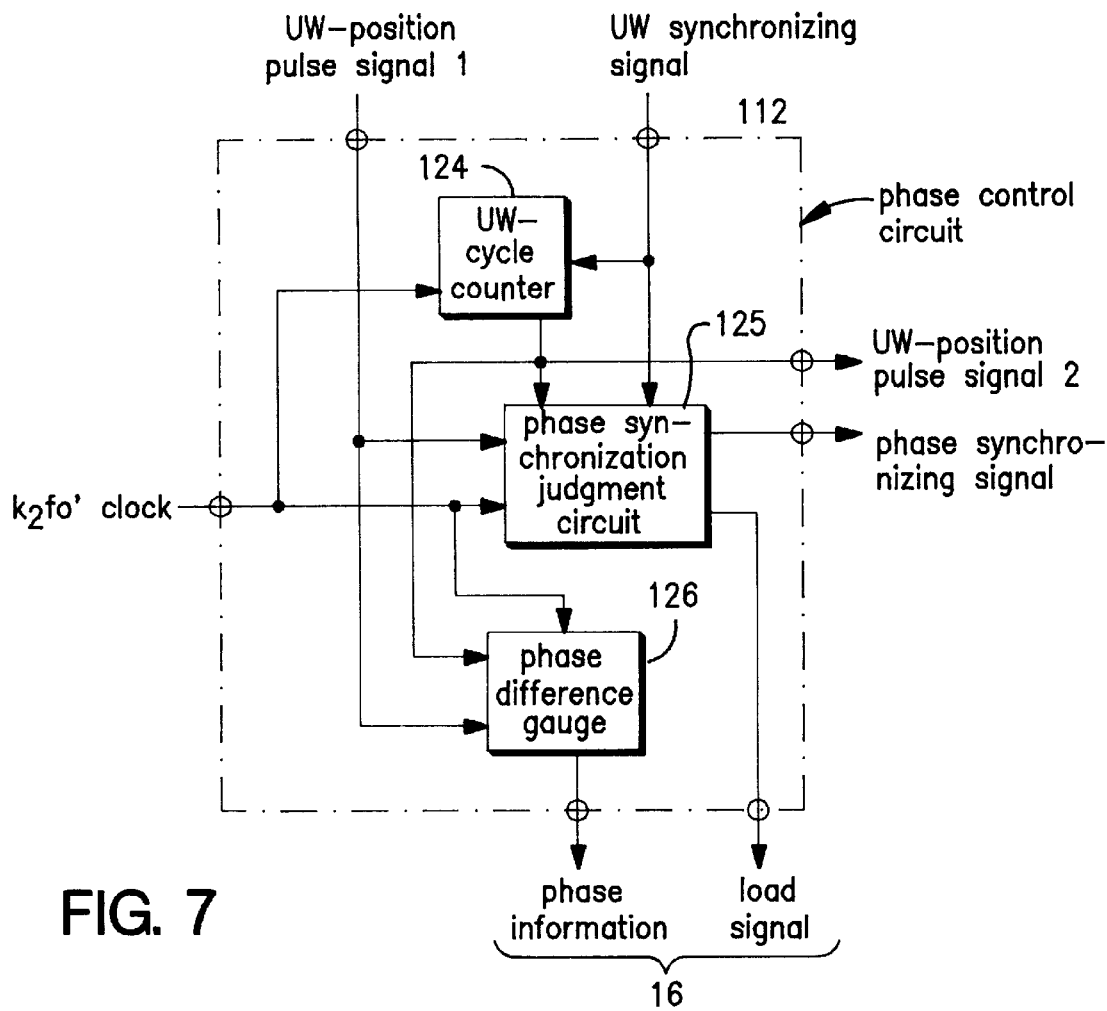
FIG. 7 is a block diagram showing the construction of a phase control circuit of the present embodiment.
Figure 10A:
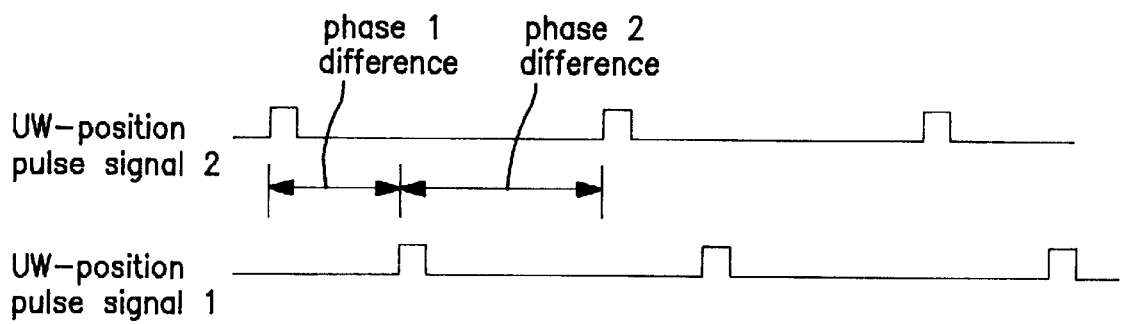
FIGS. 10(a)–10(b) show the space of phase difference measurement by the phase difference measurement device shown in FIG. 7.

FIG. 7 shows the internal construction of phase control circuit 112. UW-cycle counter 124 executes counting while the UW synchronizing signal is showing the unique-word synchronization and outputs UW-position pulse signal 2. When the UW synchronizing signal loses unique-word synchronization, phase synchronization judgment circuit 125 recognizes the occurrence of divergence between UW-position pulse signal 1 and UW-position pulse signal 2, informs the outside of "non-synchronization" with a phase synchronizing signal, and waits until unique-word synchronization is next established. When unique-word synchronization is eventually established, phase difference gauge 126 measures the degree to which UW-position pulse signal 1 is advanced or retarded using UW-position pulse signal 2 as a reference as shown in FIG. 10(a), and outputs the smaller value of the two as phase information (outputting the value of phase difference 1 in the case shown in FIG. 10(a)). At the same time phase difference gauge 126 outputs phase information, phase synchronization judgment circuit 125 changes the phase synchronizing signal from unique-word non-synchronization to unique-word synchronization and moreover, outputs a load signal just once when phase synchronizing signal is "synchronized."

Figure 8:
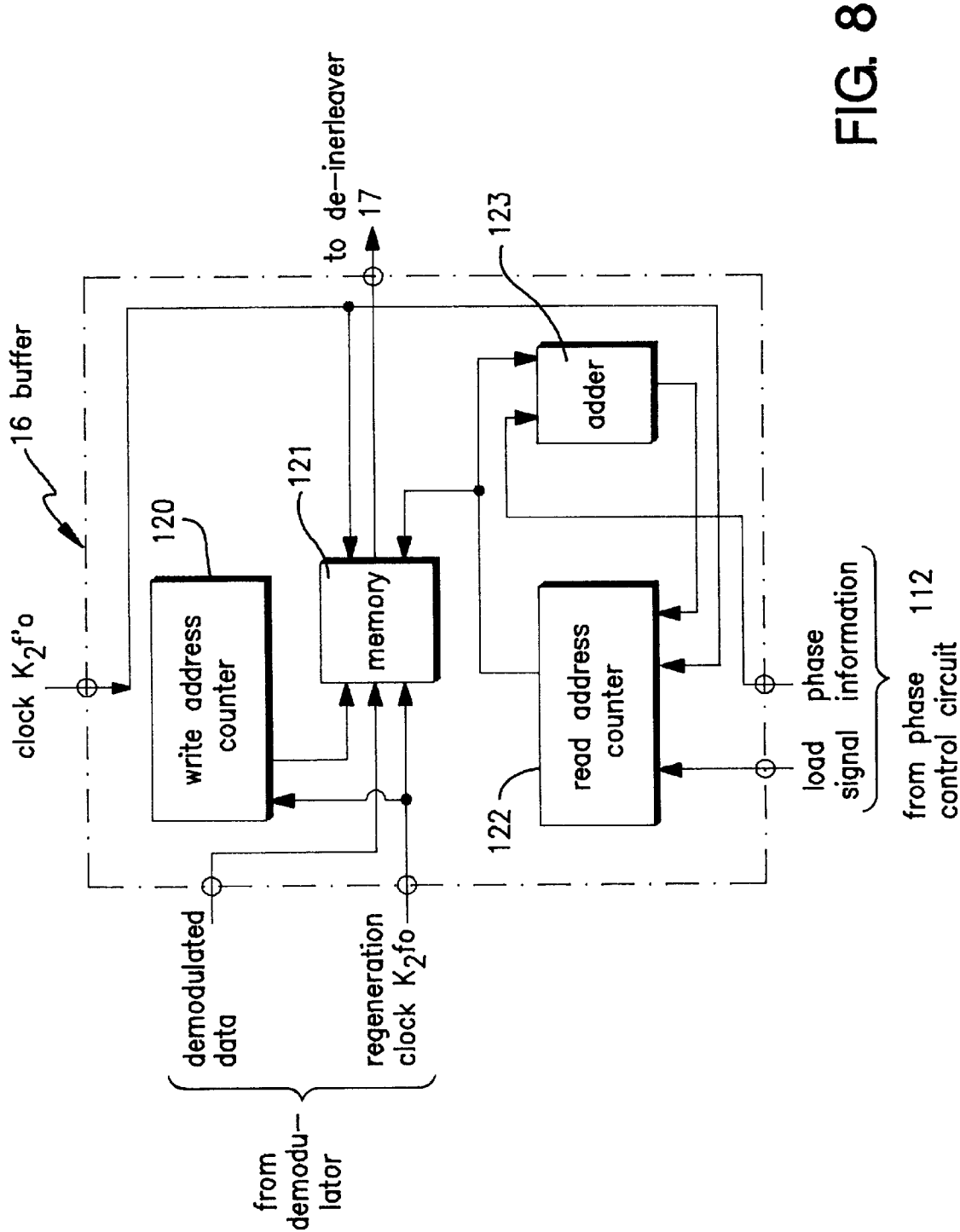
FIG. 8 is a block diagram showing the construction of a buffer of the present embodiment.
Figure 10B:
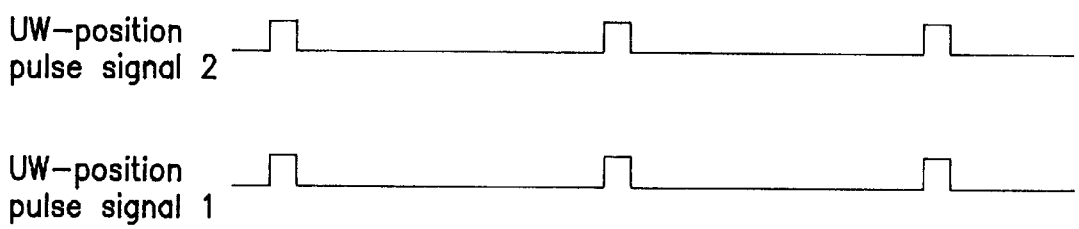

FIG. 8 shows the internal construction of buffer 16. The received demodulation signal from demodulator 14 is stored in memory 121 by write address counter 120 at regeneration clock $k_2 f_0$. The phase information and load signal outputted from phase control circuit 112 is also inputted to buffer 16. The current address value of read address counter 122 and phase information are added at adder 123, and the calculation result is stored in read address counter 122 by a load signal. By means of this operation, unique-word synchronization once having entered unique-word non-synchronization, again becomes unique-word synchronization. Phase synchronization judgment circuit 125 recognizes that UW-position pulse signal 1 matches UW-position pulse signal 2 (the state shown in FIG. 10(b)) and signals that the phase synchronizing signal is synchronized.

De-interleaver 17 carries out the reverse operation of interleaving based on UW-position pulse signal 2 to obtain the string shown in FIG. 6(a). Transmission channel decoder 15 executes error correction with respect to the output data string of de-interleaver 17 using the above-described redundancy bits, and in addition to outputting the decoded data, outputs at every m bits in the process of error correcting an effective/ineffective-judgment signal by which it is determined whether or not the data are correct (hereinbelow referred to as an "effective gate signal") as shown in FIG. 6(d). The cutting of the output data string from de-interleaver 17 every (m+k) bits is executed based on the timing of UW-position pulse signal 2. Transmission channel decoder 15 eliminates the redundancy bits from inputted data at clock $k_1 f_0'$ and outputs at a data speed of clock 2 $f_0'$ (where 2 $f_0'$<$k_1 f_0'$). Clock $k_1 f_0'$ is generated by PLL circuit 114 from the oscillation frequency 2 $f_0'$ of oscillator 22.

The decoded data outputted by transmission channel decoder 15 is separated into a non-delayed bit string and a delayed bit string by serial-parallel converter 24 at a data speed of clock 2 $f_0'$ using the timing of separation of k redundancy bits from m information bits generated by transmission channel decoder 15 for every block of m bits from which k redundancy bits have been eliminated. Because the first bit of m bits is understood to be a non-delayed bit, the data string a of non-delayed bits is outputted to shift register 20 and data string b of delayed bits is outputted to shift register 31, each being outputted at clock $f_0'$, which is the frequency division of 2 $f_0'$. In addition, the effective gate signals, which are the output of transmission channel decoder 15, are separated by serial-parallel converter 25 at clock $f_0'$ such that effective gate signal c that corresponds to non-delayed data string a becomes the input for shift register 21, and effective gate signal d that corresponds to delayed data string b becomes the input for conformity judgment circuit 28.

Shift registers 30 and 31 confer a β-bit delay (to be described later) to the data strings in a process by which non-delayed data string a from shift register 20 and delayed data string b from serial-parallel converter 24 are each inputted at clock $f_0'$, the above-described non-delayed data a and delayed data b within the decoded data are each delayed exactly β bits, and then sent to selector 33. Selector 33 switches to select one of a and b outputted from shift registers 30 and 31, and sends to output terminal 34 a restored demodulated output data such as the signal string $\{c_i\}$ 92 of FIG. 2.

Of the non-delayed and delayed data which make up the output of serial-parallel converter 24 in the above-described construction, data of the non-delayed portion are delayed n bits by shift register 20, and as a result, output data a from serial-parallel converter 24 that pass by way of shift register 20 should be absolutely identical to the other output data b of serial-parallel converter 24 (this bit set being written (a, b)). Output data a of shift register 20 and the other output data b of serial-parallel converter 24 each correspond to effective gate signal c from serial-parallel converter 25 that passes by way of shift register 21 and the other effective gate signal d, respectively (these signal sets being written (c, d)), and "c" and "d" indicate the effectiveness/ineffectiveness of "a" and "b". Thus, "c" indicates whether bit "a" decoded by transmission channel decoder 15 is correct or not, and "d" indicates whether decoded bit "b" is correct or not.

In a case in which conformity judgment circuit 28 determines "synchronization," data a and data b are identical. As seen from data b, data a is the same as the data n bits before, and data following n−1 bits after data a is stored in shift register 20. As a result, when "synchronization" is determined, selector 33 is caused to select and output the signal of data b outputted by way of shift register 31. When hits occur in the data due to, for example, a shadow effect, and abnormalities occur in data b, the abnormality is judged from effective gate signal d and the selector is switched so that the signal on the correct identical data a side is outputted, thereby preventing losses of data due to the shadow effect. When the subsequent return to normal of data b is detected by means of effective gate signal d, the selector again switches to the signal of the data b side.

Figure 9:
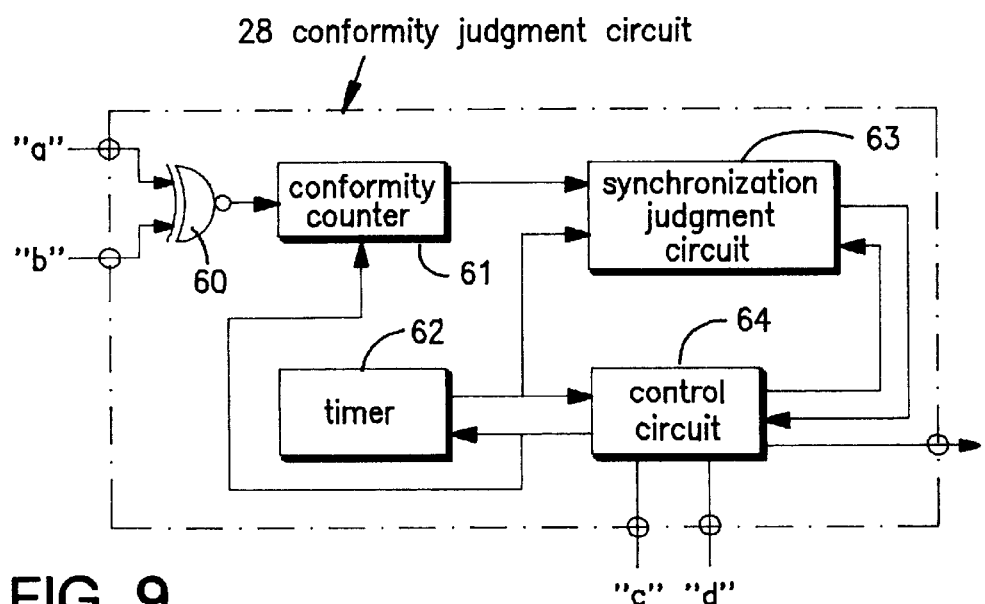
FIG. 9 is a block diagram showing an example of the construction of a conformity judging circuit of the present embodiment.

The foregoing explanation gives the general principles by which this embodiment realizes time diversity. This control is effected by conformity judgment circuit 28, and FIG. 9 is a block diagram showing one concrete example of this circuit. Conformity judgment circuit 28 is made up of EX-NOR circuit 60, conformity counter 61, timer 62, synchronization judgment circuit 63, and control circuit 64. In addition, the status of effective gate signals (c, d) and the conformity of data bits sets (a, b) can be used to determine whether or not decoded data are normal (effective/ineffective) and whether or not data strings a and b indicate "synchronization," and consequently, these signals are inputted and a select signal is outputted for use by selector 33. The judgment of "synchronization" by conformity judgment circuit 28 is achieved by monitoring the conformity between the two types of data based on the output of EX-NOR circuit 60, which takes data a and b as input. Control circuit 64 generates a start pulse for synchronization judgment at fixed intervals and causes the timer 62 to start. At the same time, the number of matches between data "a" and data "b" is counted by conformity counter 61. When timer 62 outputs a count termination pulse after a set time interval, conformity counter 61 outputs the number of matches counted at that time (the count value) to synchronization judgment circuit 63.

A predetermined count value is set in synchronization judgment circuit 63, and this circuit compares the above-described number of matches with this count value, determines that a synchronized state exists when the number of matches equals or exceeds the preset count value, and sends a synchronizing signal to the control circuit 64. In addition, synchronization judgment circuit 63 allows alteration of the above-described set count value for detecting changes from a "synchronized" state to a "non-synchronized" state and for detecting changes from a "non-synchronized" state to a "synchronized" state, the conditions for detection of changes from a non-synchronized state to a synchronized state normally being made more rigorous by raising the set count value. (When judging changes from non-synchronization to synchronization the set value is "condition 1," and when judging changes from synchronization to non-synchronization the set value is "condition 2.")

In addition, control circuit 64 constantly monitors whether data "a" and "b" are effective or ineffective based on the status of effective gate signals (c, d), and controls both the operation or non-operation of the above-described synchronization judgment circuit 63 and the switching of selector 33. When an effective gate signal c="ineffective" is inputted, control circuit 64 halts the judgment operation of synchronization judgment circuit 63 regardless of whether effective gate signal d is effective or ineffective. Further, control circuit 64 activates the synchronization judgment operation of synchronization judgment circuit 63 when (c, d)=(effective, effective), and outputs a selection signal to cause selection of data b when the degree of conformity between data a and b equals or exceeds condition 1.

Hereinbelow, the operation of conformity judgment circuit 28 will be explained for (1) a case in which a non-synchronized state changes to a synchronized state such as at initialization when starting operation of the receiving device, or in a state following an extending shadow effect ("non-synchronized—synchronized"), and (2) a case in which a receiving device in normal operation enters a data loss state of short duration due to shadow effect and then changes from this non-synchronized state back to a synchronized state ("synchronized—non-synchronized—synchronized").

(1) "non-synchronized—synchronized"

Because shift register 20 is not filled with a correct data string in the start-up state of a device or following a long interval of shadow effect, conformity judgment circuit 28 provisionally sets the selector such that the output of shift register 31 is sent to output terminal 34. The same holds true for shift register 21 to which effective gate signals are inputted, and control circuit 64 causes the judgment operation of synchronization judgment circuit 63 to halt until (c, d)=(effective, effective). When (c, d)=(effective, effective), control circuit 64 causes the synchronization judgment operation of synchronization judgment circuit 63 to start and waits for synchronization. In this case, synchronization judgment is effected by observing the conformity of data strings (a, b) using condition 1. Conformity judgment circuit 28 selects selector 33 such that the output of shift register 31 is sent to output terminal 34, and therefore, normal data b is outputted as soon as a synchronized state is achieved. Once synchronization is established, monitoring of conformity is continued using condition 2 to determine whether or not non-synchronization occurs.

(2) "synchronization—non-synchronization—synchronization"

Selector 33 operates such that output data "b" of shift register 31 is sent to output terminal 34 during an interval in which conformity judgment circuit 28 determines that synchronization exists as described hereinabove, and in this state, synchronization judgment circuit 63 monitors whether non-synchronization occurs based on condition 2. When data loss occurs due to, for example, shadow effect, non-synchronization is determined after the passage of a set interval of time (after an interval of β bits), and a signal indicating non-synchronization is sent to control circuit 64. Control circuit 64 accordingly uses a select signal to cause selector 33 to switch output to normal signal "a" from shift register 30. Control circuit 64 simultaneously uses a built-in counter to count the number of bits (number of clock pulses) of data (of signal "a" or the output of shift register 20) until synchronization is reestablished. Here, the role of shift registers 30 and 31 is to prevent the output of erratic data from selector 33 during the time period before non-synchronization was determined based on condition 2 (the time interval corresponding to β bits of the $f_0$' clock, described hereinbelow).

Control circuit 64 halts the judgment operation of synchronization judgment circuit 63 until (c, d)=(effective, effective), i.e., until received data become effective, and when (c, d)=(effective, effective), starts the judgment operation. Control circuit 64 checks the synchronizing signal from synchronization judgment circuit 63 for every timer measurement interval, and again sends a start pulse to timer 62 and conformity counter 61 to resume synchronization judgment when the synchronizing signal becomes non-synchronous. This operation is repeated successively until synchronization is established.

Figure 11:
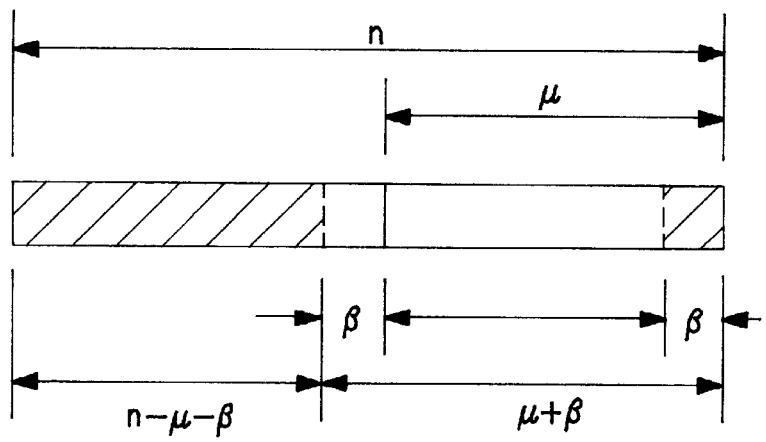
FIG. 11 shows a data string in shift register 20 in FIG. 5.

After the above-described built-in counter begins counting and when it is confirmed that synchronization is established by means of the synchronizing signal from synchronization judgment circuit 63 at the μ-th bit (where n>μ), the status of data within shift register 20 is as shown in FIG. 11. In this figure, β bits from the right side of shift register 20 corresponds to the time required for detection of synchronization, and the β bits in the center corresponds to the time required for detection of non-synchronization. (These detection times usually differ due to such factors as the different values set for the above-described conditions 1 and 2 used for detecting synchronization or non-synchronization, but for the sake of simplifying explanation, these times are made equal as β. In addition, the number of bits of shift registers 30 and 31 is preferably on the order of β.) After this type of synchronized state is detected, synchronization judgment circuit 63 continues to monitor whether or not non-synchronization occurs based on condition 2 while (n–μ–β) bits of data on the output side of shift register 20 that were previously inputted and judged to be effective are outputted.

If synchronization is maintained during the interval of (n–μ–β) bits, the operation of synchronization judgment circuit 63 is halted during the next (μ+β) bits. This halting of the operation of synchronization judgment circuit 63 is implemented in order to prevent the disruption of synchronization, since the erroneous bit string of (μ+β) bits inputted during the interval of synchronization—non-synchronization—synchronization is outputted from shift register 20 after the above-described (n–μ–β) bit string. Correct data are outputted from shift register 20 after the above-described (μ+β) bits, but because a shift in phase may occur in the (a, b) string at this time, synchronization judgment circuit 63 forces a judgment of non-synchronization and then confirms synchronization upon confirming that (c, d)=(effective, effective).

In other words, synchronization is judged by monitoring the conformity of data string (a, b) using condition 1, and synchronization is normally re-established by correct data, following which monitoring of a change to non-synchronization is continued using condition 2. As for the interval of β bits following the initial establishment of synchronization (at clock $f_0$'), erroneous bits may remain in shift register 31, which has a delay amount of β bits, so if synchronization is maintained for even the passage of β bits, selector 33 is switched such that the output of shift register 31 is outputted from output terminal 34.

In the above-described operation, non-synchronization during the monitoring interval of (n–μ–β) bits following the establishment of synchronization occurs because the (n–μ–β) bit string is not filled with correct data, and the above-described "non-synchronization—synchronization" operation (1), which is similar to the initial operation of the receiving device, is performed. Similarly, the above-described operation (1) is performed if synchronization changes to non-synchronization and the non-synchronization count value of the above-described internal counter exceeds n without reestablishing synchronization.

Figure 12:
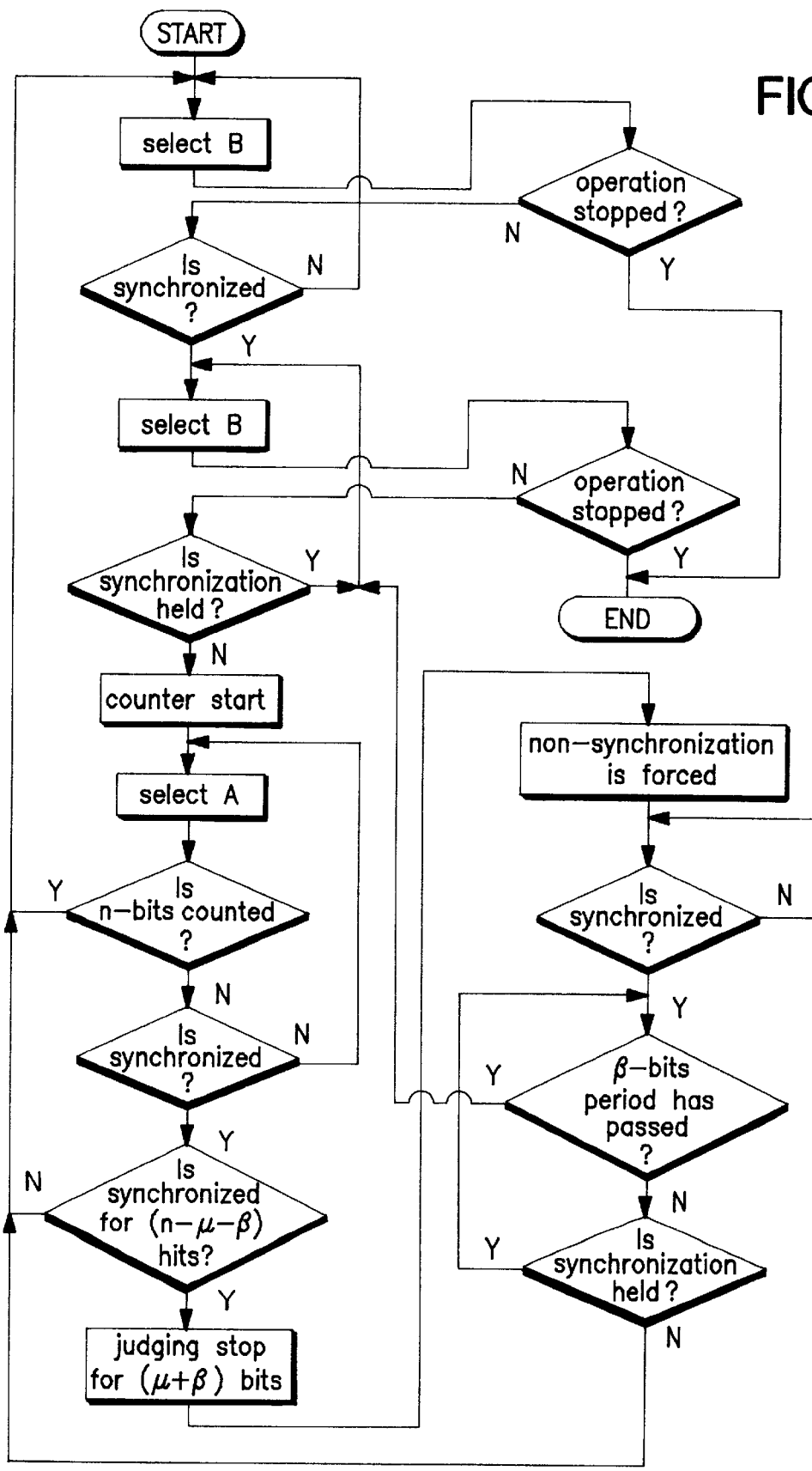
FIG. 12 is a flow chart showing the switching operation of selector 33 in FIG. 5.

In selector 33, the side on which the output of shift register 30 is inputted is the "A side," the side on which the output of shift register 31 is inputted is the "B side," and FIG. 12 shows the flow of this switching operation executed by control circuit 64.

While the foregoing explanation relates to an embodiment of the time diversity communication method of the present invention in which an interlaced signal is composed of two input digital signals, one delayed and one not delayed, it goes without saying that the present invention may also be applied to an interlaced signal composed of three or more input digital signals. In such a case, additional delay means for extracting and separating the input digital signals from an interlaced signal, delay means for effective gate signals, and selectors of corresponding construction must be provided at the receiving device. These selectors are switched by conformity judgment circuits based on effective gate signals. Accordingly, the above-described synchronized operation may be achieved by judging the synchronization between each of neighboring signals of a plurality of sequentially delayed input digital signals by means of the conformity judgment circuits, and at times of non-synchronization, using the synchronized state of a specific signal set as a standard to achieve phase coordination based on a set order of priority of synchronization.

As described hereinabove, the time diversity communication method and device of the present invention enable time diversity to be used to monitor and judge the effectiveness or ineffectiveness of decoded data using effective gate signals that are generated based not on the state of received level but on the degree of the error rate or the status of an error correction process of received decoded data, and as a result, data that are always free of coding errors can be selected and outputted, and diversity communication of high reliability can be realized. Furthermore, the present invention can provide a time diversity communication method and device that enable speedy reversion to a synchronized state when data are effective and that allow constant monitoring of divergence from synchronization even while in a synchronized state.

The present invention can further provide a time diversity communication method and device that can absorb failures in clock synchronization and the occurrence of bit lags that arise due to short breaks or hits in radio waves caused by shadow effect or other causes, by providing a buffer, a first delay means (shift register 20) for eliminating a time shift between interlaced delayed and non-delayed data strings, and a third and fourth delay means (shift registers 30, 31) on the output side; that can reduce the occurrence of losses in decoded data even in the event of hits in decoded data or aberrations in data; and moreover, that can prevent the generation of incorrect data when switching to correct data.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A time diversity communication method comprising on a sending side:

a step for producing an interlaced signal by interlacing a non-delayed signal, which is a signal inputted at a current time, with a delayed signal that is a signal inputted n bits before said non-delayed signal and is delayed n bits;

a step for encoding by dividing said interlaced signal every m bits (where m<n), and adding k redundancy bits to each block of m bits;

a step for executing an interleaving process for each block of (m+k)×j bits of encoded signal string and adding a unique word; and a step for first modulating and amplifying said interleaved signal string which has undergone said interleaving and addition of unique words, and then sending said modulated and amplified interleaved signal string as a transmission signal at a higher bit rate than that of the input signal;

and comprising on a receiving side:

a step for demodulating a received signal and storing said demodulated received signal within a buffer at a regeneration clock;

a step for reading out data stored in said buffer at a prescribed clock, executing de-interleaving, and producing a signal string of continuous (m+k)×j -bit blocks;

a step for monitoring phase of said unique words within a data string when reading out stored data from said buffer, and correcting read-out addresses from said buffer upon detection of disparity in phase of unique words;

a step for decoding said signal string, which has been de-interleaved, using said redundancy bits to judge effectiveness at every m bits of said interlaced signal to which said redundancy bits are added, and outputting effective gate signals that indicate either effectiveness or ineffectiveness in accordance with this judgment and a decoded interlaced signal from which the redundancy bits have been eliminated;

a step for separating said non-delayed signal and said delayed signal from said decoded interlaced signal, and simultaneously, separating said effective gate signal corresponding to each of said non-delayed signal and said delayed signal;

a step for delaying by n bits each of said separated non-delayed signal and said effective gate signal corresponding to said non-delayed signal; and a step for, provided that said non-delayed signal that has been delayed n bits is signal (a), said delayed signal that has been separated is signal (b), said effective gate signal that has been delayed n bits is signal (c), and the effective gate signal corresponding to said signal (b) is signal (d), and moreover, a state in which signal (a) and signal (b) continuously match is considered to be a synchronized state, monitoring effectiveness or ineffectiveness of signal (a) and signal (b) based on the states of signal (c) and signal (d), respectively; judging whether or not signal (b) is in a synchronized state with signal (a), both signals being determined as effective; and selecting an output signal.

2. A time diversity communication method according to claim 1 wherein said step for correcting phase disparity of a data string read out from said buffer on said receiving side is executed by recognizing establishment of unique-word synchronization when unique word patterns within a data string have been detected r times continuously at every cycle (where r≧2), constantly monitoring unique-word phase after establishment of synchronization, and upon detecting disparity in said unique-word phase, correcting data read-out addresses from said buffer that correspond to said phase disparity.

3. A time diversity communication method according to claim 1 wherein judgment of a synchronized state between signal (a) and signal (b) is executed by counting the number of matches between the two signals, and judging that the two signals are in a synchronized state when the value for the number of matches equals or exceeds a prescribed value.

4. A time diversity communication method according to claim 3 wherein said prescribed value is higher when detecting change from a non-synchronized state to a synchronized state than when detecting a change from a synchronized state to a non-synchronized state.

5. A time diversity communication method according to claim 1 wherein selection of an output signal on said receiving side comprises the following operations:

(1) when activating said receiving device or upon initial transition from a non-synchronized state to a synchronized state such as after long-term shadow effect:

first, effecting a setting for the output of signal (b), and not executing judgment of synchronization until signals (c, d) become (effective, effective), starting judgment of synchronization when signals (c, d) become (effective, effective), outputting signal (b), and constantly monitoring whether or not a non-synchronized state occurs once synchronization of signals (a, b) is established;

(2) when outputting signal (b) in a synchronized state:

when signals (c, d) become (effective, ineffective), switching from signal (b) to signal (a) until after a prescribed interval of $\beta_1$ bits, and again selecting signal (b) when signal (d) returns to (effective);

when signal (c) becomes (ineffective), halting judgment of synchronization regardless of whether signal (d) is effective or ineffective, and executing operation (1) after signals (c, d) return to (effective, effective);

(3) when loss of data occurs while outputting signal (b) in a synchronized state, and a non-synchronized state has been determined after a prescribed interval of $\beta_1$ bits:

simultaneously switching from signal (b) to signal (a), counting the number of bits of signal (a), and halting judgment of synchronization until signals (c, d) become (effective, effective);

starting judgment of synchronization when signals (c, d) become (effective, effective), and if a synchronized state is judged when the counted number value reaches the $\mu$-th bit (where n>$\mu$), outputting (n–$\mu$–$\beta_1$) bits of signal (a) that were previously inputted and judged to be effective as a demodulated received signal while monitoring the synchronized state of signal (a);

next, if a synchronized state is maintained during the interval of output of (n−$\mu$−$\beta_1$) bits, halting judgment of synchronization for the following ($\mu$+$\beta_1$)-bit interval so as to prevent disruption of synchronization;

after ($\mu$+$\beta_1$) bits, forcing a non-synchronized state, and establishing synchronization upon recognizing again that signals (c, d) are (effective, effective);

after initial establishment of synchronization, selecting signal (b) if synchronization is maintained after the passage of a $\beta_2$-bit interval; and executing the above-described operation of (1) if a non-synchronized state is judged during the interval of monitoring (n−$\mu$−$\beta_1$) bits of signal (a) in the above-described operations, and if synchronization is not recovered even when the count number value $\mu$ exceeds n.

6. A time diversity communication method according to claim 5 wherein count values of said $\beta_1$ and $\beta_2$ correspond to the times required for detection of a non-synchronized state and detection of a synchronized state, respectively.

7. A time diversity communication method according to claim 6 wherein said count values of said $\beta_1$ and $\beta_2$ are equal.

8. A time diversity communication device comprising:

an encoder that produces an interlaced signal by interlacing a non-delayed signal, which is a signal inputted at a current time, with a delayed signal that is a signal inputted n bits before said non-delayed signal and is delayed n bits;

a transmission channel encoder that encodes by dividing said interlaced signal every m bits (where m<n), and adding k redundancy bits to each block of m bits;

an interleaver that executes an interleaving process for each block of (m+k)×j bits of an encoded signal string and adds a unique word; and transmitting means that modulates and amplifies an interleaved signal string outputted by said interleaver, and then sends said signal string as a transmission signal;

receiving means that receives a transmission signal, amplifies and demodulates said received signal, and generates a demodulated received signal;

a buffer for storing a demodulated received signal according to a regeneration clock;

reading means for reading out data stored in said buffer according to an external clock;

phase control means that detects unique words within a data string read out from said buffer, and controls read-out addresses of data from the buffer such that phase of unique words is kept uniform;

a de-interleaver that executes de-interleaving of data strings read out from said buffer, and outputs a signal string in continuous blocks of (m+k)×j bits;

a transmission channel decoder that uses redundancy bits to judge effectiveness of each m bits of said interlaced signal to which said redundancy bits have been added of a signal string outputted from said de-interleaver, and that outputs in parallel effective gate signals that indicate either effectiveness or ineffectiveness in accordance with this judgment and a decoded interlaced signal from which said redundancy bits have been eliminated;

a first serial-parallel converter that separates said non-delayed signal and said delayed signal from said decoded interlaced signal;

a second serial-parallel converter that, in synchronism with said first serial-parallel converter, separates said effective gate signals corresponding to said non-delayed signals and said delayed signals, respectively;

first delay means that delays by n bits said non-delayed signal separated by said first serial-parallel converter;

second delay means that delays by n bits effective gate signals corresponding to said non-delayed signals separated by said second serial-parallel converter;

third delay means that confers a delay of a prescribed number of bits to said non-delayed signal (a) outputted by said first delay means, and fourth delay means that confer a delay of a prescribed number of bits to said delayed signal (b) separated by said first serial-parallel converter;

a selector that selects one of said output signals (a) and (b) outputted from said third and fourth delay means, respectively, and outputs the selected signal to the outside as a demodulated signal;

a conformity judgment circuit that inputs said non-delayed signal (a) and said delayed signal (b) from said first delay means and said first serial-parallel converter, respectively; inputs effective gate signal (c) corresponding to said non-delayed signal (a) and effective gate signal (d) corresponding to said delayed signal (b) from said second delay means and said second serial-parallel converter, respectively; monitors whether said signals (a, b) are effective or ineffective based on states of said signals (c, d); detects whether said signal (b) matches said signal (a), both signals being determined as effective; judges synchronization or non-synchronization between said signals (a, b) based on whether a counted number of continuous matches exceeds or does not reach a prescribed number; and gives selection commands to said selector based on judgment results.

9. A time diversity communication device according to claim 8 wherein said prescribed number is higher when detecting changes from a non-synchronized state to a synchronized state than when detecting changes from a synchronized state to a non-synchronized state.

* * * * *